(12) United States Patent
Dueckman

(10) Patent No.: US 9,199,825 B2
(45) Date of Patent: Dec. 1, 2015

(54) METHOD AND AN APPARATUS FOR CONTROLLING A MACHINE USING MOTION BASED SIGNALS AND INPUTS

(76) Inventor: Leonard Rudy Dueckman, Maple Ridge (CA)

( * ) Notice: Subject to any disclaimer, the term of this patent is extended or adjusted under 35 U.S.C. 154(b) by 48 days.

(21) Appl. No.: 13/500,546

(22) PCT Filed: Oct. 6, 2010

(86) PCT No.: PCT/CA2010/001559
§ 371 (c)(1),
(2), (4) Date: May 9, 2012

(87) PCT Pub. No.: WO2011/041884
PCT Pub. Date: Apr. 14, 2011

(65) Prior Publication Data
US 2012/0316686 A1    Dec. 13, 2012

Related U.S. Application Data

(60) Provisional application No. 61/249,112, filed on Oct. 6, 2009.

(51) Int. Cl.
*G05B 19/00* (2006.01)
*B66C 13/40* (2006.01)
*G08C 17/02* (2006.01)

(52) U.S. Cl.
CPC .............. *B66C 13/40* (2013.01); *G08C 17/02* (2013.01); *G05B 2219/35444* (2013.01); *G08C 2201/32* (2013.01)

(58) Field of Classification Search
CPC .................... B66C 13/40; G05B 2219/35444; G08C 2201/32; G08C 17/02

USPC .............................. 700/159, 245, 275, 65, 66
See application file for complete search history.

(56) References Cited

U.S. PATENT DOCUMENTS

| 4,445,011 A | 4/1984 | Hansen |
| 4,527,230 A | 7/1985 | Sato et al. |

(Continued)

FOREIGN PATENT DOCUMENTS

| CN | 1673554 A | 9/2005 |
| CN | 1885363 A | 12/2006 |

(Continued)

OTHER PUBLICATIONS

Canadian Intellectual Property Office, International Search Report issued in related International application No. PCT/CA2010/001559 dated Feb. 17, 2011.

(Continued)

*Primary Examiner* — Charles Kasenge
(74) *Attorney, Agent, or Firm* — Wood, Herron & Evans, LLP

(57) ABSTRACT

The present invention provides a method and apparatus for controlling a machine, such as a crane or other industrial equipment, based on motion-based input to motion sensors such as accelerometers. An input state is selected according to an integrated user input to determine a mapping between motion-based signals, corresponding to motion-based input, and one or more of a plurality of machine control signals provided for controlling the machine. Machine control signals are provided via the mapping when the input state is an operational state, and are not provided via the mapping when the input state is a standby state.

23 Claims, 7 Drawing Sheets

(56) References Cited

U.S. PATENT DOCUMENTS

| | | | |
|---|---|---|---|
| 4,754,268 A | 6/1988 | Mori | |
| 4,787,051 A | 11/1988 | Olson | |
| 4,839,838 A | 6/1989 | LaBiche et al. | |
| 4,890,099 A | 12/1989 | Takano | |
| 5,056,629 A | 10/1991 | Tsuji et al. | |
| 5,088,070 A | 2/1992 | Shiff | |
| 5,122,785 A | 6/1992 | Cooper | |
| 5,128,671 A | 7/1992 | Thomas, Jr. | |
| 5,162,986 A * | 11/1992 | Graber et al. | 700/17 |
| 5,181,181 A | 1/1993 | Glynn | |
| 5,355,352 A | 10/1994 | Kobayashi et al. | |
| 5,367,631 A | 11/1994 | Levy | |
| 5,428,548 A | 6/1995 | Pilborough et al. | |
| 5,481,265 A | 1/1996 | Russell | |
| 5,526,022 A | 6/1996 | Donahue et al. | |
| 5,578,999 A | 11/1996 | Matsuzawa et al. | |
| 5,594,462 A | 1/1997 | Fishman et al. | |
| 5,602,566 A | 2/1997 | Motosyuku et al. | |
| 5,648,897 A | 7/1997 | Johnson et al. | |
| 5,703,623 A | 12/1997 | Hall et al. | |
| 5,796,354 A | 8/1998 | Cartabiano et al. | |
| 5,835,077 A | 11/1998 | Dao et al. | |
| 6,115,028 A | 9/2000 | Balakrishnan et al. | |
| 6,243,635 B1 * | 6/2001 | Swan et al. | 701/49 |
| 6,343,237 B1 | 1/2002 | Rossow et al. | |
| 6,505,088 B1 | 1/2003 | Simkin et al. | |
| 6,624,824 B1 | 9/2003 | Tognazzini et al. | |
| 6,854,554 B2 * | 2/2005 | Brandt et al. | 180/333 |
| 6,863,144 B2 * | 3/2005 | Brandt et al. | 180/333 |
| 7,016,744 B2 * | 3/2006 | Howard et al. | 700/83 |
| 7,050,907 B1 * | 5/2006 | Janky et al. | 701/484 |
| 7,239,301 B2 | 7/2007 | Liberty et al. | |
| 7,263,441 B1 * | 8/2007 | Janky et al. | 701/484 |
| 7,280,096 B2 | 10/2007 | Marvit et al. | |
| 7,301,528 B2 | 11/2007 | Marvit et al. | |
| 7,313,476 B2 * | 12/2007 | Nichols et al. | 701/1 |
| 7,350,303 B2 | 4/2008 | Rock et al. | |
| 7,363,108 B2 * | 4/2008 | Noda et al. | 700/245 |
| 7,373,229 B2 | 5/2008 | Szczerba et al. | |
| 7,379,806 B2 | 5/2008 | Lee | |
| 7,414,611 B2 | 8/2008 | Liberty | |
| 7,415,355 B2 * | 8/2008 | Janky et al. | 701/517 |
| 7,437,211 B1 | 10/2008 | Haas et al. | |
| 7,627,427 B2 * | 12/2009 | Nichols et al. | 701/517 |
| 7,862,522 B1 * | 1/2011 | Barclay et al. | 600/595 |
| 8,216,036 B2 * | 7/2012 | Eyzaguirre et al. | 463/2 |
| 8,581,855 B2 * | 11/2013 | Spink et al. | 345/173 |
| 2002/0083880 A1 * | 7/2002 | Shelton et al. | 114/312 |
| 2004/0083940 A1 * | 5/2004 | Shelton et al. | 114/312 |
| 2004/0172167 A1 * | 9/2004 | Pasolini et al. | 700/245 |
| 2004/0236470 A1 * | 11/2004 | Dooley et al. | 700/255 |
| 2005/0192741 A1 * | 9/2005 | Nichols et al. | 701/207 |
| 2005/0204992 A1 * | 9/2005 | Shelton et al. | 114/312 |
| 2005/0219213 A1 | 10/2005 | Cho et al. | |
| 2006/0082546 A1 | 4/2006 | Wey | |
| 2006/0125806 A1 * | 6/2006 | Voyles et al. | 345/184 |
| 2006/0155421 A1 * | 7/2006 | Baek et al. | 700/276 |
| 2006/0271798 A1 * | 11/2006 | Tandon | 713/300 |
| 2007/0111736 A1 * | 5/2007 | Nichols et al. | 455/456.1 |
| 2008/0134784 A1 | 6/2008 | Jeng et al. | |
| 2009/0153349 A1 * | 6/2009 | Lin et al. | 340/825 |
| 2010/0203933 A1 * | 8/2010 | Eyzaguirre et al. | 463/2 |

FOREIGN PATENT DOCUMENTS

| | | |
|---|---|---|
| CN | 1930542 A | 3/2007 |
| CN | 101548547 A | 9/2009 |
| WO | WO 2008145980 A9 * | 12/2008 |

OTHER PUBLICATIONS

Canadian Intellectual Property Office, Written Opinion of the International Searching Authority issued in related International application No. PCT/CA2010/001559 dated Feb. 16, 2011.

Manufacturers of MEMS Accelerometers. Datasheet [online]. retrieved on Jun. 5, 2014. Retrieved from the Internet: <URL: www.sensorsportal.com/HTML/SENSORS/Accelerometers_Manuf.htm.

State Intellectual Property Office of The People's Republic of China, Notification of Third Office Action issued in corresponding Chinese Patent Application No. 201080052678.4 and English-language translation dated Jul. 17, 2015.

* cited by examiner

METHOD AND AN APPARATUS FOR CONTROLLING A MACHINE USING MOTION BASED SIGNALS AND INPUTS

FIELD OF THE INVENTION

The present invention pertains in general to human to machine interfaces and in particular to a method and apparatus for controlling a machine based on sensed motion input.

BACKGROUND

Operation of machines such as industrial or heavy machinery, mobile cranes, concrete pumps, skid steer vehicles, material handling machines, fluid handling or pumping machines, agricultural machines, telemetry systems, load haul dump machines, winches, recovery vehicles, tow trucks, self-propelled moving platforms, mining equipment, or the like, can often advantageously be performed remotely, using an appropriate human to machine interface. It is desirable that such interfaces be cost-effective, reliable, and sufficiently simple yet effective for performing required machine operations.

One type of economical industrial remote control solution involves a plurality of mechanical toggle switches or pushbuttons for actuating different aspects of the remotely controlled machine. However, this type of solution only offers on/off control of each machine aspect, since the switches or pushbuttons can only be operated in the on and off positions.

Another type of remote control solution involves a trigger input on a control handle. In this approach, a switch or pushbutton is activated with one hand while the trigger input is actuated to a desired position along a generally continuous range. The magnitude of a selected control signal is then proportional to the amount of trigger deflection. However, this type of solution requires two-handed operation, which can be cumbersome and may prevent a worker from simultaneously operating the remote controller with one hand and performing another task with the other hand. Additionally, the trigger can only be used to provide one input at a time. Other types of inputs, such as paddles or joysticks may be used in place of or in addition to a trigger. However, these solutions are typically expensive, complex, are subject to mechanical wear, and still require two-handed operation.

A class of user input devices, which has not to date been widely applied for control of machinery such as industrial equipment, is motion sensing user input devices, such as handheld devices, wearable devices, or the like. Such devices are typically applied for navigation with respect to an integrated or external video display associated with a computer, or for providing user interfaces of mobile phones, digital cameras, or gaming devices. Translational or rotational movement of the input device through space is converted into signals for navigating through a video display, for example.

For example, U.S. Pat. No. 5,181,181 discloses a handheld computer mouse which senses six degrees of motion arising from movement within three dimensions. The mouse includes three accelerometers and three angular rate sensors for sensing linear translation and angular rotation. The mouse may also include a plurality of push-buttons for providing special command signals to the computer, such as resetting a zero reference point or holding position and attitude attributes of the mouse constant despite movement while a push-button is depressed. This application, however, is solely directed toward computer control.

As another example, U.S. Pat. No. 7,280,096 discloses a motion controlled handheld device including an integral display and responsive to three-dimensional motion input via accelerometers, cameras, gyroscopes, and/or rangefinders. Motion input may be used to navigate computer applications. The device may also be switched between multiple input modes such as a motion-based mode and a gesture recognition mode, for example by pressing a particular key. Additionally, selective disengagement and reengagement of the motion sensitivity of the device may be enabled by another input key, in order to allow greater movement within a virtual desktop in a limited amount of physical space. However, this approach is not appropriate for at least some types of machine control.

Therefore there is a need for a method and apparatus for controlling a machine based on sensed motion input that is not subject to one or more limitations in the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for controlling a machine based on sensed motion input. In accordance with an aspect of the present invention, there is provided an apparatus for controlling a machine based on sensed input, the machine responsive to a plurality of machine control signals for controlling a corresponding plurality of aspects thereof, the apparatus comprising: an input module including: a selection input interface operable by an integrated user input to select an input state from a plurality of potential states including: a standby state, and a plurality of operational states; and one or more motion sensors configured to generate one or more motion-based signals based on motion-based input; and a processing and control module operatively coupled to the input module and the machine, the processing and control module configured to: determine, when the selected input state is one of the one or more operational states, a mapping between the one or more motion-based signals and one or more of the plurality of machine control signals, the mapping determined based at least in part on the selected input state; and provide, based at least in part on said mapping and said one or more motion-based signals, one or more machine control signals for controlling the machine.

In accordance with another aspect of the present invention there is provided a system for controlling a machine, the system comprising: an input apparatus comprising an input module and a processing and control module operatively coupled thereto, the input module including: a selection input interface operable by an integrated user input to select an input state from a plurality of potential states including: a standby state, and a plurality of operational states; and one or more motion sensors configured to generate one or more motion-based signals based on motion-based input; the processing and control module configured to: determine, when the selected input state is one of the one or more operational states, a mapping between the one or more motion-based signals and one or more of the plurality of machine control signals, the mapping determined based at least in part on the selected input state; and provide, based at least in part on said mapping and said one or more motion-based signals, one or more machine control signals for controlling the machine; and a machine control module configured to receive the one or more machine control signals from the input apparatus, the machine control module configured to convey the one or more machine control signals to the machine for controlling one or more of a plurality of controllable machine aspects.

In accordance with another aspect of the present invention, there is provided a method for facilitating control of a machine, the machine responsive to a plurality of machine control signals for controlling a corresponding plurality of aspects thereof, the method comprising: receiving sensed input, said sensed input including a selection input based on an integrated user input, said sensed input further including a motion-based input; determining an input state based on the selection input, the input state selected from a plurality of potential states including: a standby state, and a plurality of operational states; generating one or more motion-based signals based on the motion-based input; determining, when the selected input state is one of the one or more operational states, a mapping between the one or more motion-based signals and one or more of the plurality of machine control signals, the mapping determined based at least in part on the selected input state; and providing, based at least in part on said mapping and said one or more motion-based signals, one or more machine control signals for controlling the machine.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
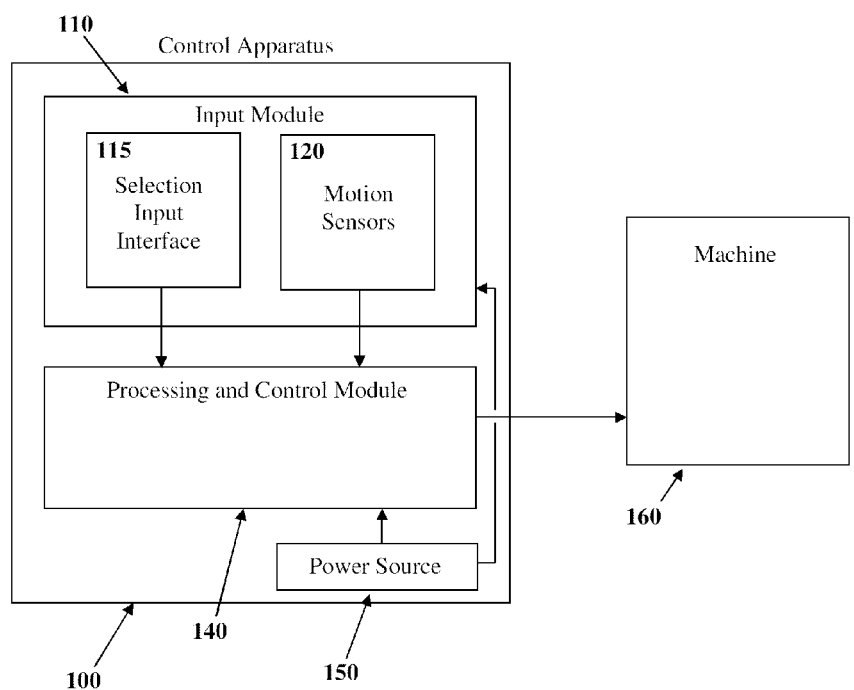
FIG. 1 illustrates an apparatus for controlling a machine based on sensed input in accordance with an embodiment of the present invention.

The term "proportional control" refers to the application of a control output signal, having a signal magnitude, or effect thereof, which is variable over a range of values. The output signal magnitude or effect thereof is proportional to a magnitude of an input signal or a function thereof, also variable over a range of values. The range of values may be a substantially continuous range, or a discrete approximation to a continuous range, the discrete approximation having more than two values. The signal magnitude may correspond to an instantaneous or average value exhibited over a predetermined time interval, such as a sample time interval.

As used herein, the term "motion-based input" refers to input which is reflective of spatial movement of an input device, for example configured as a motion-sensitive device. The input can be administered by translating or rotating a substantially self-contained motion-sensitive device in space, in one, two or three spatial dimensions. The motion-sensitive device may be, for example, an entire rigid, hand-held or wearable unit containing one or more motion base input sensors, which provide an indication of the spatial movement of the motion-sensitive device. For example a motion based input sensor can be an accelerometer, MEMs gyroscope or other motion sensor, which is sensitive to movement.

As used herein, the term "motion-based signal" refers to a signal such as an electrical and/or radio signal carrying information related to motion-based input. A motion-based signal may be generated by one or more motion-based sensors.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for controlling a machine, such as an industrial machine, based on sensed input, for example as sensed by an input module or user interface controllable by a user such as a human machine operator. The machine is responsive to a plurality of machine control signals, for example provided via control inputs, for controlling a corresponding plurality of machine aspects, such as various controllable mechanical devices, electrical devices, visual or audio devices, or combinations thereof, or the like. The invention comprises receiving sensed input including selection input and motion-based input, for example via an appropriate input module of an apparatus. An appropriate input module may include pushbuttons, motion sensors such as accelerometers, or the like. Selection input, for example applied via a selection input interface, is operable to determine an input state from a plurality of potential states including a standby state, and a plurality of operational states. Motion-based signals are generated based on the motion-based input. The present invention provides for determining, when the selected input state is one of the one or more operational states, a mapping between the one or more motion-based signals and one or more of the plurality of machine control signals. The mapping is determined based at least in part on the selected input state. The present invention provides, based at least in part on said mapping and said one or more motion-based signals, one or more machine control signals for controlling the machine. Determining the mapping and providing the machine control signals may be performed by a processing control module of the apparatus for controlling a machine.

FIG. 1 schematically illustrates an apparatus 100 for controlling a machine 160 based on sensed input in accordance with an embodiment of the present invention. The apparatus 100 comprises an input module 110, which includes a selection input interface 115 such as a plurality of pushbuttons, switches, one or more dials, or the like, and one or more motion sensors 120 such as an array of accelerometer-based motion sensors for sensing translational motion, rotational motion, or a combination thereof, of the apparatus 100 in space. In embodiments, the input module may be provided within a housing, which may be sized and shaped for operation using one hand. That is, the housing may be held in a user's hand, with hand motion imparted to the motion sensors 120. The selection input interface 115 may further be ergonomically positioned such that it may be operated by hand while holding and possibly moving the apparatus 100. The apparatus 100 further includes a processing and control module 140 operatively coupled to the input module 110 and the machine 160. The processing and control module 140 is configured to determine a mapping between motion-based signals provided due to operation of the motion sensors 120 and one or more of a plurality of machine control signals for controlling aspects of the machine 160. The processing and control module 140 is further configured provide machine control signals based at least in part on the mapping and the motion-based signals for controlling aspects of the machine 160, as described herein. The apparatus 100 may further comprise a power source 150 for providing power to the processing and control module 140, for example for powering processors, transceivers, and the like. The power source 150 may also optionally provide power to the input module 110, if required.

In embodiments of the present invention, selection input, for example applied to the selection input interface, may be operable by an integrated user input to select an input state from a plurality of potential states. The potential states include a standby state and a plurality of operational states. The integrated user input may correspond, for example, to: selecting and pressing a button, releasing a selected pressed button, pressing and holding a selected button, turning a dial or potentiometer to a selected position, operating a selected single-pole, multi-throw switch, selecting and operating one of a plurality of switches, touching a touch-sensitive surface at a selected location, speaking a voice command, or the like. In embodiments of the invention, an integrated user input may be characterized in that it corresponds to a single input condition and/or single user action, such as a single integrated movement of the hand of a human operator, which may be easily and conveniently executed by the operator. A single input condition is characterized as an operational condition of one or more buttons or other inputs, for example descriptive of which buttons are actuated and which are unactuated, in response to a user action. A single user action may be selected from a plurality of potential single user actions, for selecting a desired input state from the plurality of potential states. The selection input interface may be suitably ergonomically configured to facilitate operation thereof via integrated user inputs and/or single input conditions, for example in accordance with corresponding single integrated user actions.

In embodiments of the present invention, wherein the selection input interface is operable to select a standby state or one of a plurality of operational states, the processing and control module is configured to determine a mapping between motion-based signals and machine control signals when the selected input state is one of the plurality of operational states. Conversely, when the selected input state is the standby state, the processing and control module may be configured to refrain from providing machine control signals which are based on the motion-based signals. To this end, in a standby state, no mapping or a null mapping may be provided between motion-based signals and machine control signals. Alternatively, in a standby state, the machine control signals may correspond to a predetermined standby pattern which disposes the machine in a predetermined standby mode. The standby pattern may include non-null machine control signals, as may be required to dispose the machine in a stationary or non-stationary standby mode. However, in standby mode, typically the motion-based signals generally have no effect on the machine control signals.

For example, the standby state may correspond to a state wherein none of a plurality of buttons or switches of the selection input interface is being actuated, whereas each of the plurality of operational states may correspond to one of said buttons or switches being actuated. An operational state may be selected by an integrated user input such as corresponding to pressing and holding a button, for example.

As another example, the selection input interface may include a plurality of interconnected buttons such as "radio buttons," or the like, wherein actuating one button automatically de-actuates another button. Alternatively, a dial or single-pole multi-throw switch may be used. In this case a button remains actuated, after being momentarily pressed, until another button is actuated. An operational state may be selected by an integrated user input, such as corresponding to momentarily pressing a button, for example.

In some embodiments, actuation of a selection input results in two or more substantially simultaneous functions, which may include: determining a mapping between motion-based signals and machine control signals based on the selection input, enabling an operational state wherein machine control signals are provided for control of the machine based on motion-based input, and determining an initial reference position based on the state of the motion sensors substantially at the time of actuation of the selection input.

In some embodiments, the apparatus may be suitably ruggedized for use in industrial applications. For example, a housing and selection inputs 115 of the example apparatus illustrated in FIG. 1 may be made mechanically robust so as to be capable of withstanding rough handling, handling with heavy gloves, dropping, moisture, extreme temperatures, vibration, or the like. Electronic components within the apparatus may be similarly ruggedized, and may also be configured to withstand electrical or radio frequency (RF) interference which may be present in an industrial environment.

Embodiments of the invention provide a hand-held control station or user input apparatus comprising one or more enable switches and a motion sensor mechanism configured to detect aspects of motion, such as acceleration, in one or more linear directions, one or more rotational directions, or a combination thereof.

Figure 2:
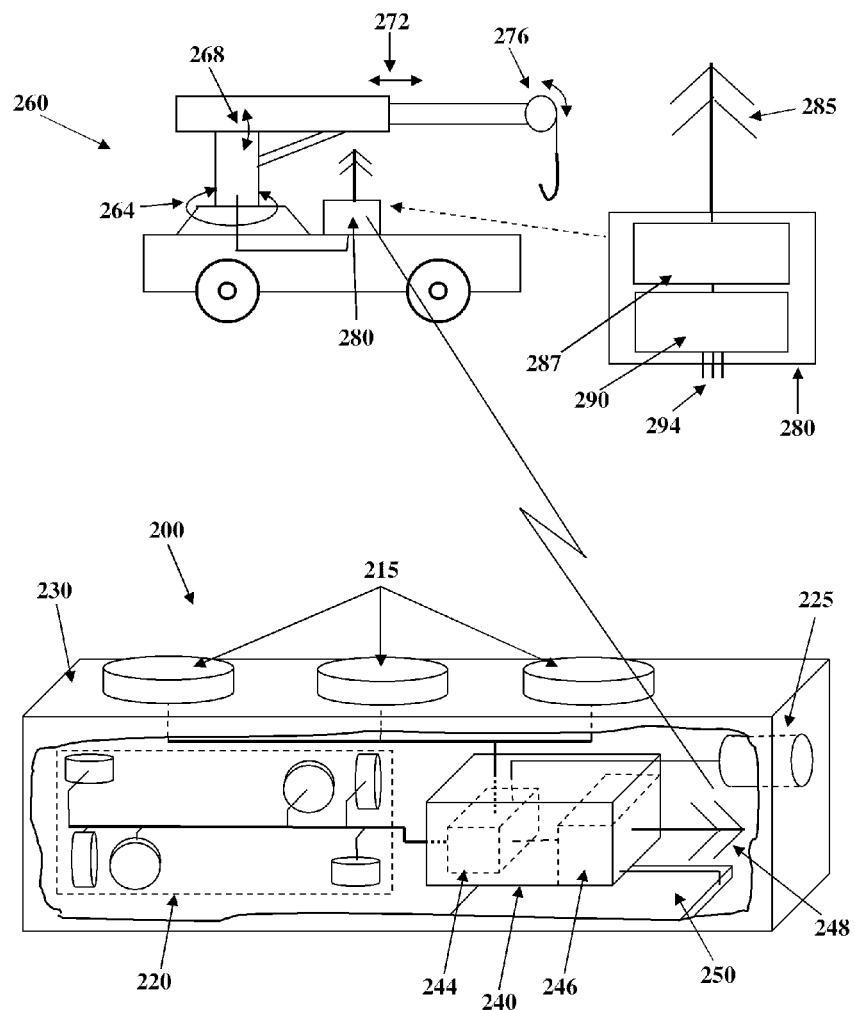
FIG. 2 illustrates an apparatus for controlling a machine based on sensed input in accordance with an embodiment of the present invention.

FIG. 2 illustrates a hand-held apparatus 200 operatively coupled to a machine 260 via an interface apparatus 280, in accordance with an example embodiment of the present invention. The apparatus comprises an input module which includes a plurality of pushbuttons 215, and a plurality of motion sensors 220 such as accelerometers. In the present example, each accelerometer is configured to detect motion along one axis. By aligning different accelerometers along different axes, translational motion in three dimensions may be detected. By providing plural accelerometers aligned in the same direction, but along offset axes, rotational motion may be detected. The apparatus may additionally or alternatively comprise other motion sensing means, such as optional camera or other light input device 225.

The apparatus 200 further comprises a processing and control module 240 operatively coupled to the pushbuttons 215 and the motion sensors 220 and optional camera 225 by electrical signal wires, circuit traces, or the like. A power source such as battery 250 is operatively coupled to at least the processing and control module 240. A housing 230, appropriately sized, weighted, balanced and shaped so as to be held in a user's hand is provided which houses motion sensors 220, optional camera 225, processing and control module 240, battery 250, and pushbuttons 215. The pushbuttons 215 are mounted on the housing 230 so as to be appropriately and conveniently operable by a user's fingers while gripping the housing 230.

As further illustrated in FIG. 2, the processing and control module 240 comprises a processor 244 configured to receive input signals from the pushbuttons 215, the motion sensors 220, and the optional camera 225, and to provide output indicative of machine control signals based thereon. The processor 244 may include suitable electronic components suitably configured for operation thereof, such as a microprocessor, microcontroller, digital signal processor, FPGA, memory, analog-to-digital converters, and the like. Memory may include RAM, ROM, magnetic or optical memory, or a combination thereof, or the like, or other computer memory as would be readily understood by a worker skilled in the art. Memory may be operatively coupled to other components of the processor 244, such as a microprocessor, and may contain operating instructions for performing operations of the processor 244. Memory may also be used to store data indicative of one or more predetermined or configurable mappings between motion-based signals and machine control signals, as well as other state variables, status or control data, or other information related to operation of the apparatus. The processor 244 is configured to provide output based on a mapping between motion-based signals from the motion sensors 220, the mapping based on input signals from the pushbuttons 215. Output from the processor 244 is provided to a communication module 246 of the processing and control module 240. The communication module 246 may include suitable electronic components such as radio frequency electronics, power amplifiers, digital or analog filters, digital signal processors, and the like. The communication module 246 is further operatively coupled to a radio antenna 248. The communication module 246 and radio antenna 248 are configured for radio communication of signals indicative of the machine control signals for use by the machine 260.

As further illustrated in FIG. 2, there is provided a machine control module 280, operatively coupled to the machine 260 and the hand-held apparatus 200, and configured to receive radio signals transmitted by the communication module 246 and radio antenna 248, and provide machine control signals to the machine based thereon. In the present embodiment, the machine control module is situated near or on board the machine 260. The machine control module 280 is communicatively coupled to the processing and control module 240 of the apparatus 200 via a radio link. Communicative coupling may comprise pairing of the machine control module 280 and processing and control module 240, for example by establishing a common communication channel therebetween. Establishing of a common communication channel may comprise establishing one or more common radio frequency bands, modulation schemes, spreading codes, channel codes, frequency hopping schedule, time access schedule, or the like, as would be readily understood by a worker skilled in the art. The machine control module 280 comprises a radio antenna 285 for receiving radio signals transmitted via antenna 248. The radio antenna is operatively coupled to a machine communication module 287 of the machine control module 280, which is configured to provide signals indicative of the machine control signals based on received radio signals. The machine communication module 287 may include suitably configured electronic components such as radio frequency electronics, power amplifiers, digital or analog filters, digital signal processors, and the like. The machine control module 280 further comprises a machine signal input module 290, operatively coupled to the machine communication module 287 and configured to provide the machine control signals via output 294 for input to the machine, based on signals received from the machine communication module 287. One or more machine control signals may be provided based on one or more received signals, for example in accordance with preprogrammed operation of the machine signal input module 290. Plural machine control signals may be provided concurrently, sequentially, or a combination thereof. The machine signal input module 290 may include suitably configured electronic components such as a microprocessor, microcontroller, digital signal processor, FPGA, memory, analog-to-digital converters, digital-to-analog converters, amplifiers, and the like. Memory may include RAM, ROM, magnetic or optical memory, or a combination thereof, or the like, or other computer memory as would be readily understood by a worker skilled in the art. Memory may be operatively coupled to other components of the machine signal input module 290, such as a microprocessor, and may contain operating instructions for performing operations of the machine signal input module 290. Memory may also be used to store data indicative of one or more state variables, status or control data, or other information related to operation of the apparatus. Appropriate provision of machine control signals may be provided based on predetermined instructions programmed into memory of the machine signal input module 290. In some embodiments, when machine control signals are mechanical, hydraulic, pneumatic, or other signals, the machine signal input module may also include mechanical, hydraulic, pneumatic, or other actuators for providing appropriate machine control signals to the machine. The machine control module further includes a power source (not shown) for operation thereof. The power source may be a battery or an input for receiving power from the machine 260.

As further illustrated in FIG. 2, the machine 260 comprises a plurality of controllable aspects 264, 268, 272 and 276, controllable by machine control signals via output 294. Controllable aspects include, but are not limited to: rotation 264 of the boom clockwise or counterclockwise, tilting of the boom 268 up or down, extension or retraction 272 of the boom, and rotation 276 of a reel clockwise or counterclockwise. Each of the controllable aspects 264, 268, 272 and 276 may be controlled via actuation of an appropriate motor-driven mechanism, such as comprising one or more gears coupled to an electrical motor or combustion engine, for example. Pneumatic or hydraulic control is also possible in some embodiments. Finally, although the machine 260 as illustrated is a mobile crane, it is contemplated that other machines may be similarly controlled. Other controllable aspects of the machine 260 may be similarly provided and controlled, as would be readily understood by a worker skilled in the art.

In some embodiments, the apparatus may comprise a video camera operatively coupled to the processing and control module, which may be configured for recognizing parts of a predetermined machine based on images supplied from the camera. Selection of an aspect of the machine to control may then be performed by pointing the camera at the aspect to be controlled. For example, if the video camera is pointed at a crane winch and a selection button actuated, an input state may be selected for control of the crane winch.

In some embodiments, the processing and control module is configured to determine, based at least in part on the selected input state, a mapping between the one or more motion-based signals and one or more machine control signals. The mapping may be determined by selection from a plurality of predetermined mappings. For example, if a first operational state is selected, then one or more sets of one or more motion-based signals may be processed and mapped in a first way to provide one or more selected machine control signals. Selecting a second operational state may likewise result in processing and mapping of motion-based signals in a second way. Processing may comprise operations such as producing, combining and scaling of motion-based signals in accordance with one or more linear or nonlinear functions, for example. Magnitudes of the machine control signals may be discretely or continuously variable over a predetermined range based on magnitudes of the motion-based signals, or on functions thereof. This may enable proportional control of one or more machine control signals by motion-based input. Concurrent proportional control of plural machine control signals corresponding to plural concurrent motion-based inputs may also be enabled. For example, plural, substantially concurrent motion-based inputs along different translational or rotational axes may each be used to provide proportional control for different machine aspects.

In some embodiments, a plurality of machine control signals may be provided concurrently, sequentially, or a combination thereof, in response to motion-based input. For example, the processing and control module 240, machine signal input module 290, or a combination thereof may be preprogrammed to respond to inputs thereto to provide machine control signals in a time-based sequence. In some embodiments, motion-based inputs, selection inputs, or a combination thereof, may be used to trigger such a plurality of machine control signals in accordance with a preprogrammed macro. For example, a macro may be programmed to perform one or more predetermined machine tasks, which may comprise a plurality of machine movements or state transitions in a predetermined order. A macro may be provided, for example, to move the machine into a power-down position, initial position, or the like.

Figure 3:
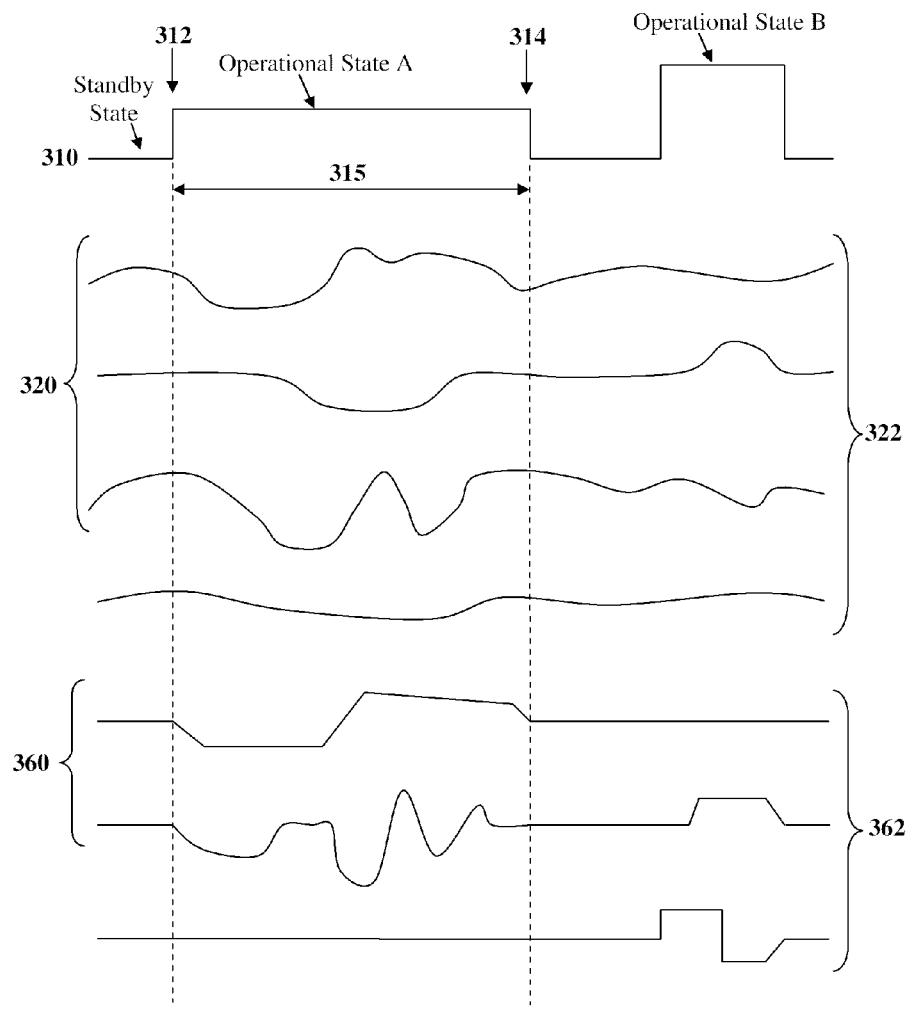
FIG. 3 illustrates operations related to processing of sensed input to provide machine control signals in accordance with an embodiment of the present invention.

FIG. 3 schematically illustrates an example of operations related to processing of selection control signal 310, indicative of a selected input state, and motion-based signals 320 to provide machine control signals 360 in accordance with an embodiment of the present invention, for example as provided by a processing and control module or method of the present invention. Selection control signal 310 may be processed to determine a time interval 315. For example, the time interval may be defined between a start time 312 and a stop time 314, wherein the start time 312 may be defined substantially as the time when the selection control signal 310 indicates that an operational state has been entered, and the stop time 314 as the time when the selection control signal 310 indicates that said operational state has been exited. As illustrated, selection control signal 310 is a single signal which may switch between a plurality of values indicative of a plurality of input states. Alternatively, the selection control signal may be an integrated set of signals, such as parallel binary signals, capable of switching between a plurality of collective values, as would be readily understood by a worker skilled in the art. During the time interval 315, one or more motion-based signals 320 may be selected and processed to provide one or more machine control signals 360, based on the selection control signal 310. Motion-based signals 320 and machine control signals 360 may be selected from larger sets of motion-based signals 322 and machine control signals 362, respectively. Alternatively or additionally, the one or more selected machine control signals 360 may be provided substantially during the time interval 315, but not during one or more other time intervals. Selection of the motion-based signals 320, the machine control signals 360, and the manner in which processing occurs, may be based at least in part on the selection control signal 310, for example by determining a mapping between motion-based signals 320 and machine control signals 360 based at least in part on selection control signal 310.

Figure 4:
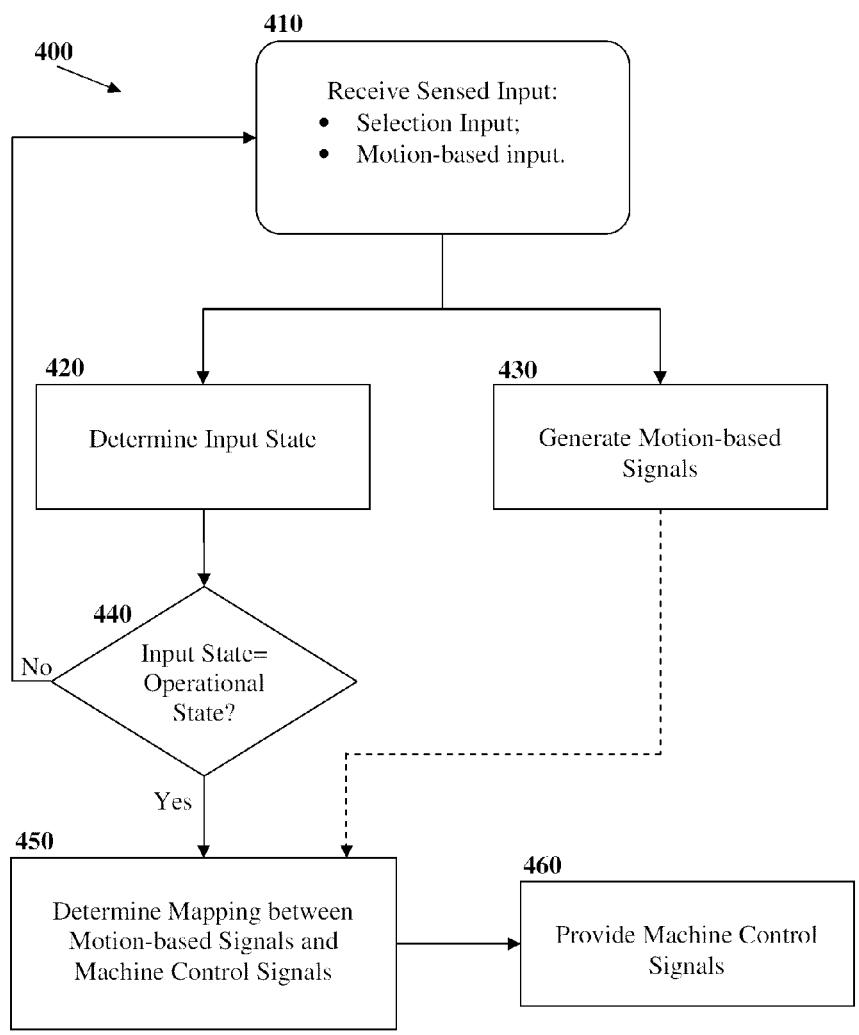
FIG. 4 illustrates a method for controlling a machine based on sensed input in accordance with an embodiment of the present invention.

FIG. 4 illustrates a method 400 for facilitating control of a machine in accordance with an embodiment of the present invention. The method comprises receiving sensed input 410, for example from an interface operable by a user. Input includes a selection input, which may be based on an integrated user input selected from a plurality of potential integrated user inputs, for example corresponding to a single user action selected from a plurality of potential single user actions. Input further includes a motion-based input, such as derived from movement of a hand-held or wearable device containing motion sensitive components. The method further comprises determining an input state based on the selection input 420. The input state may be determined to be a selected one of a plurality of potential states. Potential states may include one or more standby states, and a plurality of operational states. Each operational state may correspond to a different desired mode of operation of the machine. The method further comprises generating one or more motion-based signals based on the motion-based input 430. Motion-based signals may be generated based on output from motion-sensitive components of the hand-held or wearable device. In some embodiments, operations 420 and 430 may be performed concurrently. Alternatively, step 430 may be performed only when the input state is determined to be an operational state. The method further comprises determining, when the selected input state is one of the one or more operational states, a mapping between the one or more motion-based signals and one or more of the plurality of machine control signals. In some embodiments, this may comprise the sub-operations of determining if the selected input state is an operational state 440, and, if the selected input state is so determined, determining the mapping based at least in part on the selected input state 450. The method further comprises providing one or more machine control signals for controlling aspects of the machine 460. Providing of machine control signals may be based at least in part on said mapping and said one or more motion-based signals.

In some embodiments, the present invention comprises utilization of a selection input, such as an enable button or mode selection button, to set an initial reference position. Translational or rotational deviation in space, or both, of the motion sensors from the initial reference position, may result in motion-based signals indicative of motion along one or more axes. Motion may correspond to displacement, velocity, acceleration, or a combination thereof. Motion-based signals may be mapped to machine control inputs. For example, relative deviation from the initial reference position in a predetermined direction may be translated into a machine control input, affecting a machine parameter such as speed and direction of actuation of a movable machine part. The amount of relative deviation conveyed by the motion-based signal may be used to provide proportional control of machine control signals. Motion-based signals corresponding to motions of opposing displacement, velocity or acceleration, may be mapped to machine control signals corresponding to actuation of the movable machine part to provide opposing displacements, velocities or accelerations.

For example, in some embodiments, when a button, trigger, or other selection input is actuated, a point of reference is established for a predetermined set of functions. Deviation or movement of the motion sensor and/or associated motion-based input device from this point in a predetermined direction or about a predetermined axis of rotation results in proportional control of a corresponding aspect of the machine, with the magnitude of deviation, for example the amount of displacement, corresponding to a magnitude of machine aspect movement, for example speed at which the machine aspect moves. The further the device is moved from its reference point, the greater the magnitude of the machine movement. Releasing the button disables or suspends the proportional control. Pressing the same or another button establishes another point of reference and enables proportional control. Movement of the motion sensors in different directions may correspond to control of different aspects of the machine, the correspondence depending at least in part on actuation of the selection input.

Selection Input

The present invention provides for receiving selection input, for example via a selection input interface, which may comprise dials, pushbuttons, switches, or the like, operable by a user. Selection input may be associated with an input state thereof, and may be operable for enabling control of one or more functions or aspects of a machine. In some embodiments, the input state may be represented by a selection control signal, which may be an aggregate signal based on the states of plural selection inputs. For example, each dial, pushbutton, switch, toggle, radio button, touch screen, point and click interface, rocker pad, or the like, may be associated with a substantially constant or time-varying electrical voltage and/or current indicative of the state thereof, as would be readily understood by a worker skilled in the art. Time-varying signals may be switchedly varying, for example quickly switching between levels or waveforms but otherwise constant or repetitive. For example, a bank of buttons or switches may be operable to selectably apply predetermined voltages and/or currents to selected portions of circuitry operatively coupled thereto. A dial such as a potentiometer may be operable to vary impedance in a circuit indicative of the dial state. The collective state of the selection inputs corresponds with a collection of associated electrical voltages and/or currents, which corresponds to the selection control signal. The selection control signal may vary over time due to changes in state of the selection inputs.

In some embodiments, a digital or analog signal indicative of the selection control signal may be carried over one or more channels of a desired medium. The selection control signal may be realized as a collective signal carried by a plurality of parallel electrical conductors, such as wires, signal traces, or the like. Plural portions of the selection control signal may be multiplexed and transmitted along a single conductor. All or a portion of the selection control signal may be modulated, demodulated, filtered, transformed, stored, transmitted optically or via radio, or the like.

In some embodiments, the selection input interface comprises two or more pushbuttons located on a housing of a hand-held input module. The input module may also comprise, within the housing, motion sensors for generating motion-based signals as described herein. Each of the pushbuttons may be operable to define a desired mode of operation of the present invention, for example by selecting a desired mapping between motion-based signals and machine control signals. Each of the pushbuttons may further be operable to select between a standby state and a plurality of operational states by an integrated user input, for example corresponding to a single user action selected from a plurality thereof. During time intervals when an operational state is selected, motion-based signals, corresponding to motion-based input, are processed to provide machine control signals. Each of the pushbuttons may be operable to define a time interval during which the machine control signals are to be provided based on a selected mapping between motion-based signals and machine control signals.

In some embodiments, the selection input interface may be configured to hold an input even if a physical actuator, such as a pushbutton, is released. For example, a push-button may be used to set or reset an electronic latch or flip-flop, or similar latching logic in software or firmware. Temporary actuation of an input may thus set a desired mode of operation until a future actuation is provided.

In embodiments, the selection input interface may be ergonomically configured to provide for convenient and/or comfortable operation, for example via single-handed operation.

Motion-Based Signals

The present invention provides for generation of motion-based signals based on motion-based input. For example, one or more motion sensors may be provided to detect motion-based input applied to a hand-held or other motion-based input device. Motion-based signals may be based on motion-based input such as horizontal motion, vertical motion, twisting, rotating, or a combination thereof. Motion-based signals may further be based on displacement, velocity, acceleration, or a combination thereof, of a hand-held or other motion-based input device. Motion-based signals may vary in time over a substantially discrete or continuous range of values, proportional to intensity of a corresponding motion-based input, for example. Since the motion-based signals can exhibit a range of values, proportional control is enabled.

In some embodiments, the one or more motion sensors may comprise one or more accelerometers. For example, one or more accelerometers may be provided in an array, each accelerometer configured to produce a signal indicative of acceleration of an associated motion-based input device in at least one direction. A signal indicative of acceleration may be processed by integrating the signal to provide a signal indicative of velocity. A signal indicative of acceleration may be alternatively or additionally processed by twice integrating the signal to provide a signal indicative of displacement.

Accelerometers provided in accordance with the present invention may be, for example, piezo-electric accelerometers, micro electro-mechanical (MEMS) accelerometers, capacitative accelerometers, shear mode accelerometers, thermal accelerometers, surface acoustic wave accelerometers, laser accelerometers, pendulating integrating gyroscopic (PIGA) accelerometers, MEMs gyroscopes or the like. An accelerometer may be configured to detect acceleration along one or more predetermined spatial directions, and output an electrical signal proportional to such acceleration, proportional to average acceleration, or proportional to a single or double integral of acceleration, which may be indicative of a velocity or displacement of the accelerometer, respectively.

In some embodiments, accelerometers may be provided as a pre-packaged module. For example, accelerometer modules available from third-party vendors include the ADXL330 and ADXL345 from Analog Devices™, the AIS326DQ from STMicroelectronics™, and the KXTE9 from Kionix™. Accelerometer modules may comprise accelerometers as well as associated electronics, such as ASICs, analog-to-digital converters, filters, power means, and the like.

In some embodiments, the one or more motion sensors may comprise other motion sensor technology, such as optical or camera-based motion sensors, sensors for detecting motion through an electric or magnetic field, such as Hall-effect sensors, gyroscopic motion sensors, or the like. A combination of sensors types may be utilized to provide adequate motion-sensing capabilities. For example, in situations where a sensor of a first type is deemed to be inadequate due to inherent limitations thereof, a sensor of a second type may be used.

For example, the ADXL330 from Analog Devices™, Inc. is a 3-axis accelerometer with signal conditioned analog voltage outputs. It is capable of measuring the static acceleration of gravity for tilt-sensing applications, as well as dynamic acceleration resulting from motion, shock, or vibration.

As another example, Kionix™ provides linear accelerometers and inclinometers comprising a sensor element and an ASIC packaged in a Land Grid Array (LGA). The sensor element is fabricated from single-crystal silicon. Interrupts can be generated for acceleration on any axis above a threshold value, or for acceleration on all three axes below a threshold value. The sensor element functions on the principle of differential capacitance. Acceleration causes displacement of a silicon structure resulting in a change in capacitance. An ASIC detects and transforms changes in capacitance into an analog output voltage, which is proportional to acceleration. This voltage is digitized by an on-board A/D converter and is accessed via an inter-integrated circuit ($I^2C$) bus or serial peripheral interface (SPI).

In some embodiments, an array of motion sensors such as accelerometers may be configured to provide up to six axes of motion-based signals. For example, up to three motion-based signals may be provided based on translational movement in one or more orthogonal directions in space, for example along one or more orthogonal X, Y and Z axes. As another example, up to three motion-based signals may be provided based on rotational movement about one or more orthogonal X, Y and Z axes, for example due to yaw, pitch, and/or roll of a motion-based input device. In some embodiments, translation may be differentiated from rotation by utilizing two or more spatially separated motion sensors connected to a common rigid body. For example, if a pair of such motion sensors detect motion in a common direction, this may indicate translational motion; if the pair of motion sensors detect motion in different directions, this may indicate rotational motion. Signals from plural motion sensors may be processed by one or more electronic circuits or processors to provide appropriate indications of motion, as would be readily understood by a worker skilled in the art.

In some embodiments, additional processing may be applied to the motion-based signals. For example, to reduce undesired mechanical or electrical noise or jitter which may be introduced into the motion-based signals, filtering, time-averaging, combining of sensor inputs, or the like, may be applied to motion-based signals. As another example, motion-based signals may be held constant or turned off when no substantial motion of the apparatus is detected. For example, this may advantageously avoid signal integrators from integrating noise picked up by motion sensors, which might otherwise result in input drift over time.

In embodiments, motion-based signals may comprise an indication of displacement, velocity, acceleration, or a combination thereof, relative to a predetermined or arbitrarily defined reference frame. Motion-based signals may further comprise an indication of times corresponding to portions of the indicated displacement, velocity, acceleration, or combination thereof. For example, a motion-based signal may indicate a substantially continuous or discrete time sequence of multi-axis displacement, velocity or acceleration values, along with a corresponding time reference for each portion of the sequence. Providing implicit or explicit time references may facilitate subsequent signal processing, as would be readily understood by a worker skilled in the art.

In some embodiments, one or more motion-based signals, in accordance with a selected mapping, may be a motion-based representation of a desired machine operation. For example, a motion-based signal indicative of a tipping or swaying motion-based input may correspond to tilting or swinging of a crane boom, respectively. As another example, a twisting motion-based input may correspond to twisting of a machine part, or rotation of a reel or other rotating machine part. As yet another example, translational motion-based inputs in one or more directions may correspond to movement of a machine over ground in a corresponding direction, for example via wheels or tracks. Other motion-based signals indicative of user-supplied motion-based inputs may also be mapped to machine control signals, the magnitudes of the motion-based signals proportional to a magnitude of the machine control signals. Motion-based inputs may correspond to translating while twisting, translating while tilting, tilting followed by twisting, or the like, for example.

Processing and Control

The present invention provides for one or more processing operations applied to selection signals and motion-based signals to facilitate providing one or more machine control signals. Processing operations may be performed using a processing module, which may comprise centralized and/or distributed electronics, such as a microprocessor, memory, programmable logic device, FPGA, logic circuits, amplifiers, transistors, and the like. Processing may also utilize software, firmware, or a combination thereof, for example provided as part of the processing module. In some embodiments, at least a portion of the processing electronics or processing module may be integrated or closely associated with selection inputs and/or motion sensors. For example, signals from pushbuttons or other inputs may be amplified, filtered, debounced or multiplexed; signals from accelerometer chips may be processed, encoded and transmitted, for example via a serial bus such as an $I^2C$ bus.

In embodiments of the present invention, the processing and control module may be configured to interpret input signals from an input interface and determine an aspect or axis of the machine to control, as well as a direction of control and amount of proportional control.

In embodiments of the present invention, processing and control means, such as a processing and control module, may be associated with one or more of: a control or user interface apparatus such as a hand-held device, hardware and/or software incorporated into the machine being controlled, and one or more intermediate processing or relay stations, such as a computer which is operatively coupled to the control or user interface apparatus and the machine to be controlled, and which processes signals provided by the control or user interface apparatus to provide machine control signals. For example, a hand-held user interface apparatus may provide raw signals to a computer relay or machine-mounted module, or may process signals internally.

In embodiments of the present invention, processing comprises determining a mapping between the one or more motion-based signals and one or more of the plurality of machine control signals, based at least in part on the selected input state or selection control signal indicative thereof. The set of available mappings may be pre-programmed and configured so as to facilitate appropriate control of a predetermined machine or type of machine. Mappings may be stored in internal or external memory, such as RAM, ROM, solid-state, optical or magnetic storage media, or the like. Determining a mapping from a set of available mappings may comprise determining a desired mapping from a predetermined correspondence between selected input states and mappings. For example, actuating one of a plurality of pushbuttons of the selection input may correspond to selection of a corresponding mapping.

In some embodiments, the set of available mappings may be programmable. For example, the present invention may comprise software or firmware which may be modified or updated to provide a desired or customized set of available mappings. Different mappings may be defined for different users, or for control of different machines, or in different environments, for example. In some embodiments, the set of available mappings may be provided via a computer program product recorded on a computer readable medium.

In some embodiments, each mapping from the set of available mappings may function to map one or more types of input motion to one or more machine control signals. For example, types of input motion applied to an input device may include axial rotation (roll), vertical tilting (pitch), horizontal tilting (yaw), linear translation along a predetermined direction relative, or a combination thereof. Motions may be relative to a reference system based around the input device, or an external reference system such as conveyed by a gravitational, sonic, electric or magnetic field, or the like. Each of the selected types of input motion may be mapped to one or more selected machine control signals, based on the mapping. A mapping may map plural selected types of input motion to plural selected machine control signals, thereby facilitating simultaneous multi-axis machine control.

In some embodiments, at least one mapping from the set of available mappings maps motion-based input to a particular machine control signal. That is, for each machine control signal, there may exist at least one mapping which maps a motion-based input to that machine control signal. In this manner, embodiments of the present invention may provide for control of all controllable aspects of the machine.

In some embodiments, two or more mappings from the set of available mappings may map motion-based input to a given machine control signal. In this manner, embodiments of the present invention may provide for different modes of controlling the same aspect of the machine, or provide for different overlapping combinations of machine control functionalities, or both. This may facilitate ease of operability when performing common functions.

In some embodiments, a first machine control signal may be controllable concurrently with a second machine control signal in one mode, and the first machine control signal may be controllable concurrently with a third machine control signal in another mode. For example, when positioning a crane from its parked position, it may be desirable to allow concurrent control of boom tilt and boom extend/retract aspects of the crane according to a first mapping. When operating the crane to move a load, it may be desirable to allow concurrent control of boom tilt and boom rotate aspects of the crane, according to a second mapping. In both mappings, boom tilt is a controllable aspect.

Generally, mappings may be preconfigured to facilitate ease of operability of a machine to perform common tasks. For example, mappings may be configured such that aspects of a machine which are commonly controlled concurrently are available for control via the same mapping. Banks of mappings may be configured so that tasks which are commonly executed in sequence may be easily selected in sequence by operation of the selection input interface.

In embodiments, each mapping may define one or more functional correspondences between one or more motion-based signals and one or more machine control signals. The mapping may comprise one or more processing operations, including but not limited to: combining or superposition of motion-based signals to provide one or more machine control signals, applying linear or nonlinear gain, time-based or frequency-based filtering, time quantization, value quantization, threshold detection, time delays, signal averaging, differentiation, integration, mapping via a linear or nonlinear function, or a combination thereof, or the like. Each mapping may take as input one or more predetermined motion-based signals and provide as output one or more predetermined machine control signals.

In embodiments of the invention, the processing and control module is configured to provide proportional control of the machine based on motion-based input. For example, the motion-based signals may exhibit a discrete or continuous range of values, corresponding to a magnitude of displacement, rotation, velocity or acceleration of the motion sensors. A mapping may operate on one or more of such motion-based signals to provide machine control signals exhibiting a corresponding range of values. The machine control signal values may be proportional to the motion-based signal values. For example, proportionality may be direct or inverse. Machine control signals may alternatively be proportional to a function of motion-based signal values, for example describable by a monotone increasing or decreasing function, periodic function, invertible or non-invertible function, or the like.

Each mapping may be described, represented and/or implemented in one or more various ways, for example by a discrete, continuous or piecewise continuous mathematical function, autoregressive moving average (ARMA) process, time-domain or frequency-domain transfer function, analytic or non-analytic function, one or more tables of input and output values, one or more hierarchical arrangements of tables of values, or a combination thereof, or the like.

Each mapping may be implemented by one or more various means such as a look-up table, hierarchical series of lookup tables, functional transformation applied by digital and/or analog signal processing electronics, computer program, or a combination thereof, or the like. In one embodiment, a digital signal processor, configured to implement a selected mapping, is applied to produce one or more machine control signals based on one or more motion-based signals. In one embodiment, an electronically implemented series of look-up table modules, possibly combined with one or more multiplication or addition modules, may be configured to implement a selected mapping. A worker skilled in the art would understand how to provide for appropriate signal processing to provide output signals based on input signals, given one or more selectable mappings therebetween.

In embodiments, the processing and control module is configured to provide a mapping between motion-based signals and machine control signals when the selected input state is an operational state. Conversely, the processing and control module may be configured to inhibit or refrain from providing motion-based signals due to such a mapping when the selected input state is the standby state. For example, in the standby state, a null mapping or motion-independent mapping may be implemented which results in provided machine control signals being substantially independent of motion-based signals. Alternatively, in the standby state, the processing and control module may be configured to inhibit or refrain from providing machine control signals, provide substantially constant machine control signals, or provide for another configuration of machine control signals corresponding to a predetermined standby state of the machine.

In some embodiments, the processing module may be configured to interpret motion-based signals relative to an initial state, such as the position and orientation of the motion sensors substantially at the time when an operational state is entered. For example, operation of the selection input interface to enter an operational state may trigger the processing module to define an initial reference state, wherein the motion-based signals correspond to spatial deviation from the initial reference state. In some embodiments, the initial reference state may be explicitly defined. Alternatively, the initial reference state may be implicitly defined. For example, if the motion-based signals provide an indication of acceleration or velocity, and the initial reference state is an initial position and/or orientation, then defining the initial reference state may comprise resetting or zeroing one or more displacement or rotation accumulators, wherein the displacement or rotation accumulators are incremented or decremented according to acceleration and/or velocity indicated by the motion-based signals.

Providing Machine Control Signals

The present invention is further configured to provide machine control signals to a machine, for example via a processing and control module and/or other signalling and/or control means. For example, machine control signals may be provided to machine control inputs of a machine using wired communication, wireless communication, or a combination thereof. One or more standard or proprietary signalling protocols, suitable to the control application being performed, may be used to communicate machine control signals from the processing and control module to a machine or machine control inputs thereof. Presently there are several companies providing remote control solutions for industrial equipment, and related protocols. For example, standards such as Hart, WirelessHart, ISA100, Bluetooth, Ethernet, Wireless Ethernet, GPIB, ZigBee, USB, and the like, may be adapted to provide remote control solutions in embodiments of the present invention. Other wired or wireless communication techniques may be employed to communicate machine control signals, as would be readily understood by a worker skilled in the art.

In some embodiments, the processing and control module may comprise a signal transmitter coupled to a user interface device or relay device, and a corresponding signal receiver may be operatively coupled to a machine to be controlled. Communication of machine control signals may be performed between the signal transmitter and signal receiver. Communication may be direct or indirect, for example through a network or relay. Communication may comprise wired communication, wireless communication, radio communication, optical communication, communication using signals carried by mechanical or fluid means, or the like. Generally, the signal transmitter may transform the machine control signals to a form appropriate for transmission and transmits the signals in a manner receivable by the signal receiver. The signal receiver receives the transmitted signals and transforms them into a form usable for controlling the machine. The signal receiver is then operatively coupled to the machine to provide control of controllable aspects thereof by providing machine control signals in the form of electrical, mechanical, fluid, or other appropriate types of signals.

In some embodiments, the signal transmitter and signal receiver are communicatively coupled via wireless radio communication. Wireless communication between wireless signal transmitter and receiver may comprise encoding, decoding, modulating, demodulating, and other operations. Wireless communication may involve digital or analog frequency, amplitude, or phase modulation, communication over multiple redundant channels, frequency hopping spread spectrum, multiple access channel sharing, source and channel coding, and the like, as would be readily understood by a worker skilled in the art to facilitate appropriately reliable and functional wireless communication in a given environment.

In some embodiments, telemetry such as video or signals indicative of machine orientation, position, state of controllable machine aspects, or the like, may be transmitted by the machine being controlled and displayed so as to be viewable by a user of the control apparatus to facilitate machine operation. Telemetry may be displayed via a visual display such as an LCD monitor, visual indicators such as LEDs, via force feedback, or via one or more audible signals, for example. Telemetry may be used to provide feedback discernable to a user, or to provide feedback signals automatically processed in the processing and control module to provide the machine control signals.

Embodiments of the present invention provides for one or more actuators configured for physically controlling one or more functions of a machine, along with appropriate drivers for control of the actuators.

The present invention may be configured for control of one or more of a variety of machines, such as light industrial machinery, heavy industrial machinery, mobile or stationary cranes, concrete pumps, skid steer vehicles, material handling machines, fluid handling or pumping machines, agricultural machines, telemetry systems, load haul dump machines, winches, recovery vehicles, tow trucks, self-propelled moving platforms, mining equipment, vehicles, robots, appliances, computers, computer interfaces, electrical equipment, mechanical equipment, or the like. The machine being controlled is responsive to a plurality of control signals, for example via a plurality of control inputs, such as inputs accepting an electrical, electromagnetic, optical, mechanical, or other signal which may be utilized to control one or more corresponding controllable aspects of the machine. Controllable aspects may include mechanical devices, electrical devices, visual or audio outputs, or combinations thereof, or the like. For example, controllable aspects may include electrically, mechanically, pneumatically or hydraulically controllable motors, actuators, sirens, lights, visual displays, electric or magnetic field generators, or the like. Machine control signals are provided to the machine in a form appropriate for desired control of each controllable aspect of the machine.

In some embodiments, the machine control inputs are configured to accept standard or custom-defined control signals. In this case, the present invention may provide an adapter or interface for transforming control signals as received, for example by radio, to machine control signals appropriate for providing to electrical, mechanical, hydraulic, or pneumatic machine control inputs.

In some embodiments, the machine control inputs are pre-configured for operation according to the present invention. For example, a radio interface module may be provided integral to the machine, which is configured to transforms radio signals to appropriate machine control signals.

Embodiments of the present invention may facilitate a substantially lower cost means for control than equivalent traditional control solutions. For example, motion sensing capabilities for plural linear and/or angular axes may be provided by installing a single mass-produced accelerometer chip, or the like. Such chips may be provided at a lower cost than plural joystick, trigger or other prior art control means, while still facilitating simultaneous multi-axis proportional control. Furthermore, embodiments of the present invention may facilitate one-handed control, which may facilitate ease of operability and multitasking. Additionally, embodiments of the present invention may provide for a substantially safe means for control by providing a simple, one-handed and intuitive user interface. Embodiments of the present invention may also provide for a reliable machine control means, due to the use of motion-based sensors and a simple selection input interface. This configuration may offer a lower complexity interface compared to prior art solutions, with fewer traditional mechanical parts, such as switches, toggles, joysticks, triggers, and the like subject to breakage.

The invention will now be described with reference to specific examples. It will be understood that the following examples are intended to describe embodiments of the invention and are not intended to limit the invention in any way.

EXAMPLE

FIGS. 5A to 5D illustrate an example of a hand-held user interface apparatus 500 for remote operation of a crane 550, in accordance with an example embodiment of the present invention. The crane 550 comprises at least the following remotely controllable aspects: rotatable reel 555, boom extension/retraction 560, boom tilt 565, and boom rotate 570. The reel 555 is attached to a cable and hook assembly 557, or other assembly. The user interface apparatus includes a selection input interface comprising a set of three pushbutton selection inputs 502, 504, 506 configured to generate a selection control signal. The user interface apparatus further comprises a plurality of motion sensors which are responsive to at least rotational motion, such as pitch and roll, of the apparatus 500 to generate motion-based signals. The apparatus 500 is operatively coupled to an internal or external processing and control module which is configured to generate machine control signals based on the selection control signal and the motion-based signals, as described below.

The present example may relate to a hand-held apparatus for providing adequate proportional control using only 3 push buttons. The apparatus may facilitate operation of two ore more proportional channels at a time.

When all of the pushbuttons 502, 504, 506 are in the unactuated position, no machine control signals are transmitted that would cause motion of any controllable aspects 555, 560, 565, or 570. This corresponds to a stationary standby state for crane 550. In some embodiments, a locking button, code or key may be provided which locks the crane 550 in a stationary state, such that accidental actuation of control inputs does not result in undesired crane operation.

While one of pushbuttons 502, 504, 506 is actuated, by pressing and holding the pushbutton, motion-based signals are mapped to machine control signals for controlling a subset of controllable aspects 555, 560, 565, or 570, according to a mapping corresponding with the pushbutton 502, 504, 506 actuated. The mapping is enabled as long as the pushbutton 502, 504, 506 is actuated, that is between a start time corresponding to actuation of pushbutton and a stop time corresponding to de-actuation thereof. Therefore, actuation of a pushbutton functions simultaneously to (a) determine a mapping between motion-based signals and machine control signals, and (b) define a time interval during which motion-based signals are mapped to machine control signals by said mapping, i.e. during which an operational state is selected. This configuration facilitates suitably simple and intuitive operation of the crane 550, such operation having a desirable economy of user effort and capable of being performed using one hand. Note that actuation of a desired pushbutton, or refraining from actuation of a pushbutton, corresponds to an integrated user input, which may be satisfied by performing a single user action, that is, pressing a single button or refraining from pressing a button, which facilitates desirably simple control.

Actuation of a pushbutton 502, 504, 506 also serves to define an initial reference position 510 of the apparatus 500, wherein the motion-based signals correspond to spatial deviation from the initial reference position 510. For example, an intensity or level of the motion-based signals may correspond to an amount of displacement or rotation of the apparatus 500 relative to the initial reference position 510.

Figure 5A:
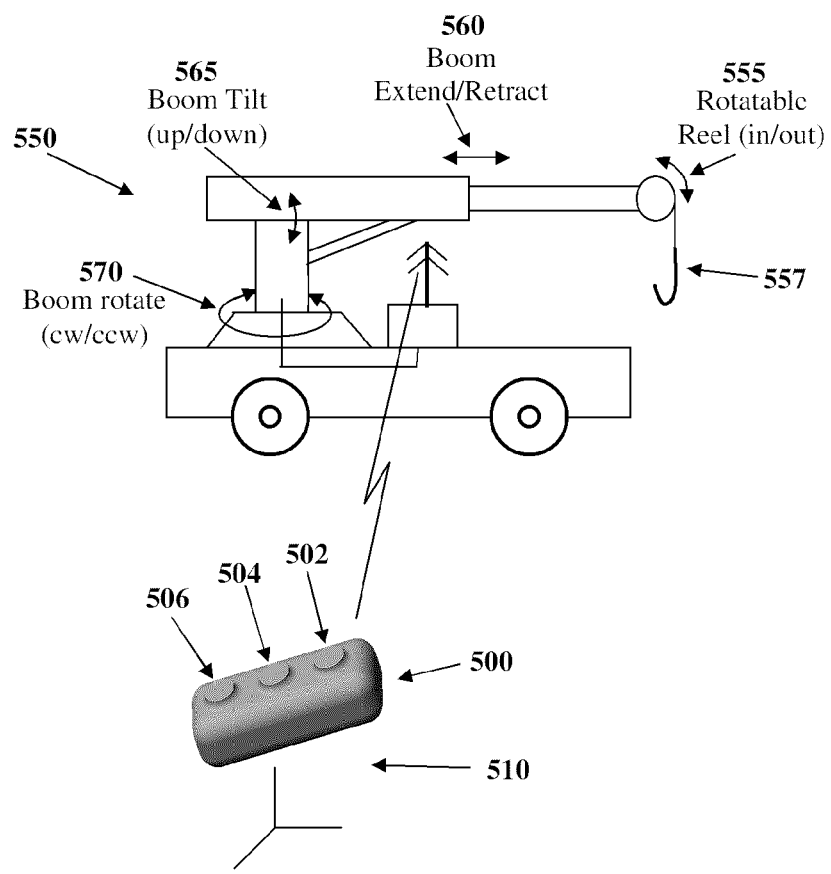
FIGS. 5A to 5D illustrate a method and apparatus for remote operation of a crane in accordance with an example embodiment of the present invention.
Figure 5B:
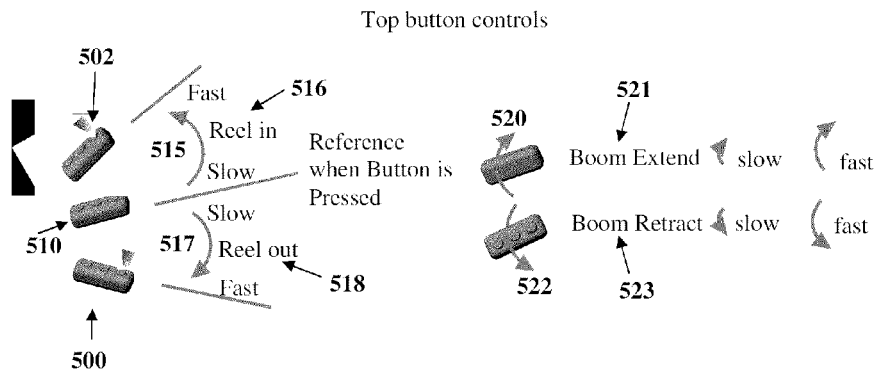

As illustrated in FIG. 5B, while the first pushbutton 502 is actuated, corresponding to a first operational state, a first mapping is enabled for mapping motion-based signals to machine control signals. According to the first mapping, tilting of the apparatus 500 upward 515 or downward 517 relative to the initial reference position 510 is mapped to a machine control signal for controlling reel 555. Upward tilting 515 corresponds to rotation of reel 555 to reel in 516 cable and hook assembly 557, while downward tilting 517 corresponds to rotation of reel 555 to reel out 518 cable and hook assembly 557. The magnitude of upward or downward tilting angle 515 or 517 is proportional to the speed at which reel 555 is actuated by the machine control signal. Thus, a user can operate the reel at a desired speed and in a desired direction by varying the tilt angle of the apparatus 500.

As also illustrated in FIG. 5B, while the first pushbutton 502 is actuated, rotation 520 or 522 of the apparatus 500, about an axis parallel to its longest side, relative to the initial reference position 510, is mapped by the first mapping to a machine control signal for controlling boom extension/retraction 560. Rotation in one direction 520 corresponds to boom extension 521, while rotation in another direction 522 corresponds to boom retraction 523. The magnitude of the rotation 520 or 522 is proportional to speed at which the boom is extended or retracted. Thus, a user can operate the boom extension/retraction aspect 560 at a desired speed and in a desired direction by varying the rotation angle of the apparatus 500.

Figure 5C:
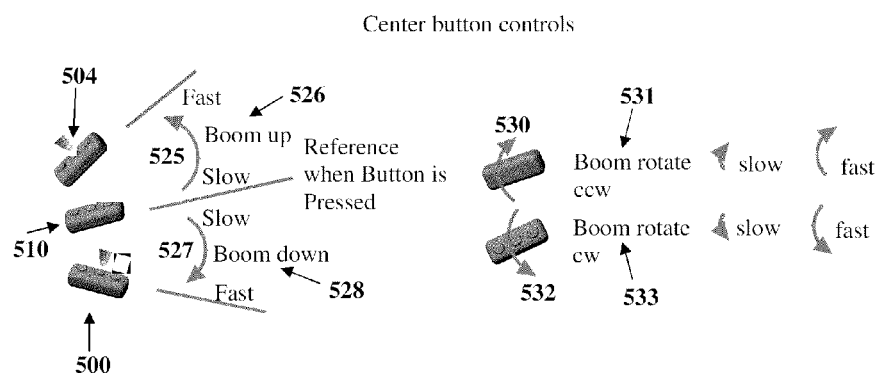

As illustrated in FIG. 5C, while the second pushbutton 504 is actuated, corresponding to a second operational state, a second mapping is enabled for mapping motion-based signals to machine control signals. According to the second mapping, tilting of the apparatus 500 upward 525 or downward 527 relative to the initial reference position 510 is mapped to a machine control signal for controlling boom tilt 565. Upward tilting 525 corresponds to boom tilt 565 to raise the boom 526, while downward tilting 527 corresponds to boom tilt 565 to lower the boom 528. The magnitude of upward or downward tilting angle 525 or 527 is proportional to the speed at which boom tilt 565 is actuated by the machine control signal. Thus, a user can operate the boom tilt 565 at a desired speed and in a desired direction by varying the tilt angle of the apparatus 500.

As also illustrated in FIG. 5C, while the second pushbutton 504 is actuated, rotation 530 or 532 of the apparatus 500, about an axis parallel to its longest side, relative to the initial reference position 510, is mapped by the second mapping to a machine control signal for controlling boom rotation 570. Rotation in one direction 530 corresponds to counterclockwise boom rotation 531, while rotation in another direction 532 corresponds to clockwise boom rotation 533. The magnitude of the rotation 530 or 532 is proportional to speed at which the boom is rotated. Thus, a user can operate the boom rotation 570 at a desired speed and in a desired direction by varying the rotation angle of the apparatus 500.

Figure 5D:
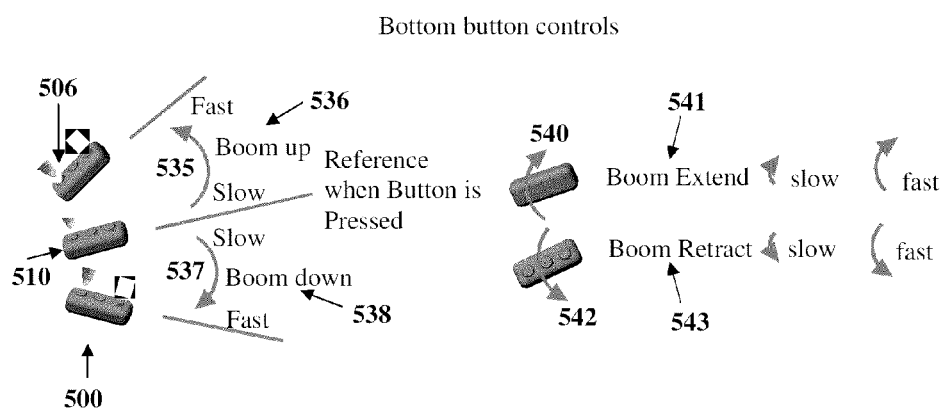

As illustrated in FIG. 5D, while the third pushbutton 506 is actuated, corresponding to a third operational state, a third mapping is enabled for mapping motion-based signals to machine control signals. According to the third mapping, tilting of the apparatus 500 upward 535 or downward 537 relative to the initial reference position 510 is mapped to a machine control signal for controlling boom tilt 565. Upward tilting 535 corresponds to boom tilt 565 to raise the boom 536, while downward tilting 537 corresponds to boom tilt 565 to lower the boom 538. The magnitude of upward or downward tilting angle 535 or 537 is proportional to the speed at which boom tilt 565 is actuated by the machine control signal. Thus, a user can operate the boom tilt 565 at a desired speed and in a desired direction by varying the tilt angle of the apparatus 500.

As also illustrated in FIG. 5D, while the third pushbutton 506 is actuated, rotation 540 or 542 of the apparatus 500, about an axis parallel to its longest side, relative to the initial reference position 510, is mapped by the third mapping to a machine control signal for controlling boom extension/retraction 560. Rotation in one direction 540 corresponds to boom extension 541, while rotation in another direction 542 corresponds to boom retraction 543. The magnitude of the rotation 540 or 542 is proportional to speed at which the boom is extended or retracted. Thus, a user can operate the boom extension/retraction 560 at a desired speed and in a desired direction by varying the rotation angle of the apparatus 500.

In some embodiments, the apparatus 500 may be operable to control other aspects of the crane, for example navigation of the crane on wheels, operation of lights, sirens, or the like, starting and stopping of electrical motors or combustion engines, actuation of magnetic or mechanical gripping mechanisms attached to the reel, or the like.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. An apparatus for controlling a machine based on sensed input, the machine responsive to a plurality of machine control signals for controlling a corresponding plurality of aspects thereof, the apparatus comprising:
   a. an input module including:
      a selection input interface operable by an integrated user input to select an input state from a plurality of potential states including: a standby state, and a plurality of operational states, the selection input interface operable by the integrated user input at least to switch from the standby state to a selected one of the operational states; and
      one or more motion sensors configured to generate one or more motion-based signals based on relative movement of the apparatus in space by a user, said relative movement of the apparatus in space representative of a desired operation of the machine; and
   b. a processing and control module operatively coupled to the input module and the machine, the processing and control module configured to:
      determine, when the selected input state is one of the one or more operational states, a mapping between the one or more motion-based signals and one or more of the plurality of machine control signals, the mapping determined based at least in part on the selected one of the operational states, wherein the determined mapping is selected from a plurality of potential mappings based at least in part on the selected one of the operational states, each of the plurality of potential mappings corresponding to a different set of tasks executable by the machine, and operation of the integrated user input further defining an initial reference position from which the motion-based signals are measured, said further defining being coincident with said selection of the input state from the plurality of potential states when switching from the standby state; and
      provide, based at least in part on said determined mapping and said one or more motion-based signals, one or more machine control signals for controlling the machine.

2. The apparatus according to claim 1, wherein the processing and control module is configured to provide proportional control of the machine based on magnitudes of the one or more motion-based signals.

3. The apparatus according to claim 1, wherein the determined mapping is selected from a plurality of potential mappings based at least in part on the selected input state, each of the plurality of potential mappings corresponding to a predetermined set of tasks commonly executable by the machine.

4. The apparatus according to claim 1, wherein the apparatus is hand-held or wearable.

5. The apparatus according to claim 1, wherein the integrated user input corresponds to one or more of: pressing a selected button, releasing a selected pressed button, pressing and holding a selected button, turning a dial to a selected position, operating a selected switch, touching a touch-sensitive surface in a selected manner, and speaking a voice command.

6. The apparatus according to claim 1, the apparatus further comprising a signal transmitter operatively coupled to the processing and control module, the signal transmitter configured for wireless transmission of the machine control signals to the machine.

7. The apparatus according to claim 1, wherein the motion-based input comprises one or both of: translational motion, and rotational motion.

8. The apparatus according to claim 1, wherein the determined mapping maps two or more concurrent motion-based signals to two or more machine control signals.

9. The apparatus according to claim 1, wherein operation of the integrated user input further determines a time interval during which the mapping is enabled.

10. The apparatus according to claim 1, wherein the machine is selected from the group comprising: light industrial machinery, heavy industrial machinery, mobile cranes, stationary cranes, concrete pumps, skid steer vehicles, material handling machines, fluid handling machines, agricultural machines, telemetry systems, load haul dump machines, winches, recovery vehicles, tow trucks, self-propelled moving platforms, mining equipment, and vehicles.

11. A system for controlling a machine, the system comprising:
    a. an input apparatus comprising an input module and a processing and control module operatively coupled thereto, the input module including:
       i. a selection input interface operable by an integrated user input to select an input state from a plurality of potential states including: a standby state, and a plurality of operational states, the selection input interface operable by the integrated user input at least to switch from the standby state to a selected one of the operational states; and
       ii. one or more motion sensors configured to generate one or more motion-based signals based on relative movement of the apparatus in space by a user, said relative movement of the apparatus in space representative of a desired operation of the machine;
       the processing and control module configured to:
       i. determine, when the selected input state is one of the one or more operational states, a mapping between the one or more motion-based signals and one or more of the plurality of machine control signals, the mapping determined based at least in part on the selected one of the operational states, wherein the determined mapping is selected from a plurality of potential mappings based at least in part on the selected one of the operational states, each of the plurality of potential mappings corresponding to a different set of tasks executable by the machine, and operation of the integrated user input further defining an initial reference position from which the motion-based signals are measured, said further defining being coincident with said selection of the input state from the plurality of potential states when switching from the standby state; and
ii. provide, based at least in part on said determined mapping and said one or more motion-based signals, one or more machine control signals for controlling the machine; and
b. a machine control module configured to receive the one or more machine control signals from the input apparatus, the machine control module configured to convey the one or more machine control signals to the machine for controlling one or more of a plurality of controllable machine aspects.

12. The system according to claim 11, wherein the input apparatus further comprises a signal transmitter operatively coupled to the processing and control module, the signal transmitter configured for wireless transmission of the machine control signals, and wherein the machine control module further comprises a signal receiver configured for wireless reception of the machine control signals.

13. The system according to claim 11, wherein the processing and control module is configured to provide magnitudes of the plurality of machine control signals based on magnitudes of the one or more motion-based signals, thereby facilitating proportional control of the machine.

14. The system according to claim 11, wherein the determined mapping is selected from a plurality of potential mappings based at least in part on the selected input state, each of the plurality of potential mappings corresponding to a predetermined set of tasks commonly executable by the machine.

15. A method for facilitating control of a machine, the machine responsive to a plurality of machine control signals for controlling a corresponding plurality of aspects thereof, the method comprising:
a. providing an apparatus according to claim 1;
b. receiving sensed input, said sensed input including a selection input based on an integrated user input, said sensed input further including relative movement of the apparatus in space by a user, said relative movement of the apparatus in space representative of a desired operation of the machine;
c. determining an input state based on the selection input, the input state selected from a plurality of potential states including: a standby state, and a plurality of operational states, wherein the selection input is operable at least to switch from the standby state to a selected one of the operational states;
d. generating one or more motion-based signals based on the user movement of the apparatus in space;
e. determining, when the selected input state is one of the one or more operational states, a mapping between the one or more motion-based signals and one or more of the plurality of machine control signals, the mapping determined based at least in part on the selected one of the operational states, wherein the determined mapping is selected from a plurality of potential mappings based at least in part on the selected one of the operational states, each of the plurality of potential mappings corresponding to a different set of tasks executable by the machine, and operation of the integrated user input further defining an initial reference position from which the motion-based signals are measured, said further defining being coincident with said selection of the input state from the plurality of potential states when switching from the standby state; and
f. providing, based at least in part on said determined mapping and said one or more motion-based signals, one or more machine control signals for controlling the machine.

16. The method according to claim 15, wherein the one or more motion-based signals have magnitudes proportional to magnitudes of the motion-based input, and the one or more machine control signals have magnitudes proportional to one or more of said magnitudes of the one or more motion-based signals.

17. The method according to claim 15, wherein determining the mapping comprises selecting the mapping from a plurality of potential mappings based at least in part on the determined input state, each of the plurality of potential mappings corresponding to a predetermined set of tasks commonly executable by the machine.

18. The method according to claim 15, wherein the integrated user input corresponds to one or more of: pressing a button, releasing a button, pressing and holding a button, turning a dial, operating a switch, touching a touch-sensitive surface, and speaking a voice command.

19. The method according to claim 15, wherein the one or more machine control signals are conveyed to the machine at least in part via radio communication.

20. The method according to claim 15, wherein the motion-based input comprises one or both of: translational motion, and rotational motion.

21. The method according to claim 15, wherein the determined mapping maps two or more concurrent motion-based signals to two or more machine control signals.

22. The method according to claim 15, further comprising determining, based on operation of the integrated user input, a time interval during which the mapping is enabled.

23. The method according to claim 15, wherein the machine is selected from the group comprising: light industrial machinery, heavy industrial machinery, mobile cranes, stationary cranes, concrete pumps, skid steer vehicles, material handling machines, fluid handling machines, agricultural machines, telemetry systems, load haul dump machines, winches, recovery vehicles, tow trucks, self-propelled moving platforms, mining equipment, and vehicles.

* * * * *